US008141038B2

(12) United States Patent
O'Connell et al.

(10) Patent No.: US 8,141,038 B2
(45) Date of Patent: Mar. 20, 2012

(54) VIRTUAL RAS REPOSITORY

(75) Inventors: Margaret M. O'Connell, Allston, MA (US); Manuel A. Balderas, Arlington, MA (US); Jennifer L. Pinkus, Milton, MA (US); Hanna Russo, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1557 days.

(21) Appl. No.: 11/321,857

(22) Filed: Dec. 29, 2005

(65) Prior Publication Data

US 2007/0156764 A1 Jul. 5, 2007

(51) Int. Cl.
*G06F 9/44* (2006.01)

(52) U.S. Cl. .......................... 717/120; 717/103; 717/121

(58) Field of Classification Search .................. 707/100; 717/100–103, 106–108; 719/328
See application file for complete search history.

(56) References Cited

U.S. PATENT DOCUMENTS

| 5,778,368 | A | 7/1998 | Hogan et al. |
| 5,867,709 | A | 2/1999 | Klencke |
| 6,167,564 | A | 12/2000 | Fontana et al. |
| 6,256,773 | B1* | 7/2001 | Bowman-Amuah ........... 717/121 |
| 6,336,217 | B1* | 1/2002 | D'Anjou et al. .............. 717/121 |
| 6,349,404 | B1 | 2/2002 | Moore et al. |
| 6,405,364 | B1* | 6/2002 | Bowman-Amuah ........... 717/101 |
| 6,427,230 | B1* | 7/2002 | Goiffon et al. ................ 717/108 |
| 6,697,819 | B2 | 2/2004 | Boudreau |
| 6,785,882 | B1 | 8/2004 | Goiffon et al. |
| 6,931,624 | B1 | 8/2005 | Snider |
| 7,150,000 | B1* | 12/2006 | Feldman ........................ 717/103 |
| 7,152,224 | B1* | 12/2006 | Kaler et al. .................... 717/121 |
| 7,318,216 | B2 | 1/2008 | Diab |
| 7,844,949 | B2* | 11/2010 | Clemm et al. ................. 717/121 |
| 8,060,855 | B2* | 11/2011 | Hegde et al. .................. 717/103 |
| 2002/0032626 | A1 | 3/2002 | DeWolf et al. |
| 2002/0087947 | A1 | 7/2002 | Kwon et al. |
| 2002/0108100 | A1* | 8/2002 | Wajima et al. ................ 717/103 |
| 2003/0046282 | A1* | 3/2003 | Carlson et al. ..................... 707/6 |
| 2003/0172370 | A1* | 9/2003 | Satuloori et al. ............. 717/120 |
| 2003/0182211 | A1 | 9/2003 | Sakurazawa et al. |
| 2003/0182470 | A1 | 9/2003 | Carlson et al. |
| 2003/0200532 | A1* | 10/2003 | Gensel .......................... 717/120 |

(Continued)

FOREIGN PATENT DOCUMENTS

JP 2004362430 A 12/2004

OTHER PUBLICATIONS

Brown, A., et al., SOA Development Using the IBM Rational Software Development Platform [online], 2005 [retrieved Nov. 29, 2011], Retrieved from Internet: <http://www-07.ibm.com/sg/soa/downloads/SOA_Development_using_Rational_Software.pdf>, pp. 1-36.*

(Continued)

*Primary Examiner* — Thuy Dao
*Assistant Examiner* — Todd Aguilera
(74) *Attorney, Agent, or Firm* — Raymond Szeto; Hoffman Warnick LLC

(57) ABSTRACT

The present invention provides a virtual Reusable Asset Specification (RAS) repository. A method in accordance with an embodiment of the present invention includes: providing RAS assets for each different lifecycle phase of a software asset; and linking the RAS assets together using RAS related-assets.

15 Claims, 4 Drawing Sheets

U.S. PATENT DOCUMENTS

| | | | |
|---|---|---|---|
| 2003/0233365 | A1 | 12/2003 | Schmit et al. |
| 2004/0034860 | A1 | 2/2004 | Fernando et al. |
| 2004/0177335 | A1 | 9/2004 | Beisiegel et al. |
| 2004/0249728 | A1 | 12/2004 | Wu |
| 2004/0261059 | A1* | 12/2004 | Spencer et al. ............... 717/120 |
| 2004/0268295 | A1 | 12/2004 | Culter |
| 2005/0080640 | A1 | 4/2005 | Bhaskaran et al. |
| 2005/0138603 | A1 | 6/2005 | Cha et al. |
| 2005/0268232 | A1* | 12/2005 | Stienhans et al. ............. 715/700 |
| 2006/0005163 | A1 | 1/2006 | Huesken et al. |
| 2006/0089828 | A1* | 4/2006 | Larsen et al. .................. 703/22 |
| 2007/0022028 | A1 | 1/2007 | Wulfert et al. |
| 2007/0022106 | A1* | 1/2007 | Brandt et al. ..................... 707/4 |
| 2007/0150852 | A1 | 6/2007 | Balderas et al. |
| 2008/0065750 | A1 | 3/2008 | O'Connell et al. |

OTHER PUBLICATIONS

Hunt J., et al., "A Model for Software Libraries", Proceedings of the First International Workshop on Library-Centric Software Design [online], 2005, [retrieved Nov. 20, 2011], Retrieved from Internet: <http://lcsd05.cs.tamu.edu/papers/hunt_et_al.pdf>, pp. 1-10.*

Robson, R.N., "Using Hypertext to Locate Reusable Objects", Proceedings of the Twenty-Fifth International Conference on System Sciences [online], 1992 [retrieved Nov. 29, 2011], pp. 549-557.*

USPTO, "Office Action", Notification Date Dec. 15, 2008, U.S. Appl. No. 11/530,141, filed Sep. 8, 2006.

USPTO, "Final Office Action", Notification Date Jun. 11, 2009, U.S. Appl. No. 11/530,141, filed Sep. 8, 2006.

Magrogan, P.J. et al., "Object-oriented Methodology and Architecture for Reuse (OMAR)", Conference Proceedings, Object Technology Centers, Baltimore, MD, USA (Jun. 23-25, 1999), pp. 201-206.

Natu, S. et al., "Digital Asset Management Using a Native XML Database Implementation", CITC 4'03, Oct. 16-18, 2003, pp. 237-241.

Levine, T., "Reusable Software Components", Ada Letters, Jul./Aug. 1998, vol. XVIII, No. 4, pp. 32-46.

Spyns, P. et al., "Data Modelling Versus Ontology Engineering", SIGMOD Record, vol. 31, No. 4, Dec. 2002, pp. 12-17.

O'Connell et al., U.S. Appl. No. 11/321,542, filed Dec. 29, 2005, Office Action dated Jul. 24, 2009, 23 pages.

"RFC Submitted to OMG Reusable Asset Specification (RAS)", Oct. 12, 2003, Object Management Group, Document #: ad/2003-10-12, Version 2.1, pp. 1-110.

USPTO, "Final Office Action", U.S. Appl. No. 11/321,542, Notification Date Jan. 5, 2010, 19 pages.

Bohrer et al., "The San Francisco Project: An Object-Oriented Framework Approach to Building Business Applications", IEEE 1997, pp. 416-424.

PTO Notice of Allowance and Fee(s) Due, U.S. Appl. No. 11/321,542, Date Mailed Aug. 25, 2011, 8 pages.

IBM Corporation, Association relationships, http://publib.boulder.ibm.com/...r/rtnlhelp/v6r0m0/index.jsp?topic=%2Fcom.ibm.xtools.modeler.doc%2Ftopics%2Fcassn.html, Copyright IBM Corporation 2004, 2005, 1 page.

USPTO, "Office Action", U.S. Appl. No. 11/321,542, Notification Date Feb. 7, 2011, 32 pages.

Grant Larsen, "Pattern Solutions Patterns with RAS", Apr. 2004, http://patterns-wg.fuka.info.waseda.ac.jp/event/ps2004/grant-larsen.pdf, pp. 1-39.

Grant Larsen, "Asset Based Development", Nov. 2003, http://xml.coverpages.org/Larsen-RAS200311.pdf, pp. 1-45.

* cited by examiner

VIRTUAL RAS REPOSITORY

BACKGROUND OF THE INVENTION

1. Field of the Invention

The present invention generally relates to software asset management, and more specifically relates to a virtual RAS repository for facilitating the reuse of software assets.

2. Related Art

The organization and management of disparate stores of linked information is often a daunting task, especially for large enterprises. One example of this involves the management of the life cycle of a corporation's software assets. For instance, the following operations need to be managed:

(1) Acquisition: software components are received/generated by the corporation and are made available for deployment across the corporation;
(2) Deployment: the components are deployed to all users in the corporation who need them;
(3) Instantiation: the components are used as part of an application;
(4) Updates: as patches or product updates become available, instances of the components are updated;
(5) Customizations and extensions: in-house customizations and extensions to the components are distributed to users;
(6) Statistics: data is collected and analyzed for software investments, including usage, problems and local fixes; and
(7) Archiving: as components are phased out, they are archived.

The management and organization of a corporation's software assets is further complicated when reusable software assets are involved.

SUMMARY OF THE INVENTION

The present invention provides a virtual Reusable Asset Specification (RAS) repository for organizing and managing disparate software assets throughout a large enterprise. In accordance with the present invention, RAS repositories are built for runtime use as part of an enterprise system. Existing artifacts are wrapped in RAS (i.e., creating RAS assets for the existing artifacts), such that many pieces of a software system can be accessed in a common, standardized way without having to be re-written for use in a virtual RAS repository. By using the "related-asset" feature of RAS, artifacts can be considered in different ways according to their life cycle (e.g., a separate asset can be associated with each lifecycle phase of a software asset and these separate assets are all related together). For example, a portlet web application archive (WAR) asset could be related to an asset representing the portlet deployed, and also related to an asset representing the portlet instantiated. Assets can be located across distant physical locations and brought together in one "virtual" RAS repository by taking advantage of the "related-asset" feature of RAS. Relationships amongst data can be maintained and linked data can be observed.

A first aspect of the present invention is directed to a method for providing a virtual Reusable Asset Specification (RAS) repository, comprising: providing RAS assets for different lifecycle phases of a software asset; and linking the RAS assets together using RAS related-assets.

A second aspect of the present invention is directed to a system for providing a virtual Reusable Asset Specification (RAS) repository, comprising: a system for providing RAS assets for different lifecycle phases of a software asset; and a system for linking the RAS assets together using RAS related-assets.

A third aspect of the present invention is directed to a program product stored on a computer readable medium for providing a virtual Reusable Asset Specification (RAS) repository, the computer readable medium comprising program code for performing the steps of: providing RAS assets for different lifecycle phases of a software asset; and linking the RAS assets together using RAS related-assets.

A fourth aspect of the present invention is directed to a method for deploying an application for providing a virtual Reusable Asset Specification (RAS) repository, comprising: providing a computer infrastructure being operable to: provide RAS assets for different lifecycle phases of a software asset; and link the RAS assets together using RAS related-assets.

A fifth aspect of the present invention is directed to computer software embodied in a propagated signal for providing a virtual Reusable Asset Specification (RAS) repository, the computer software comprising instructions to cause a computer system to perform the functions of: providing RAS assets for different lifecycle phases of a software asset; and linking the RAS assets together using RAS related-assets.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

Figure 1:
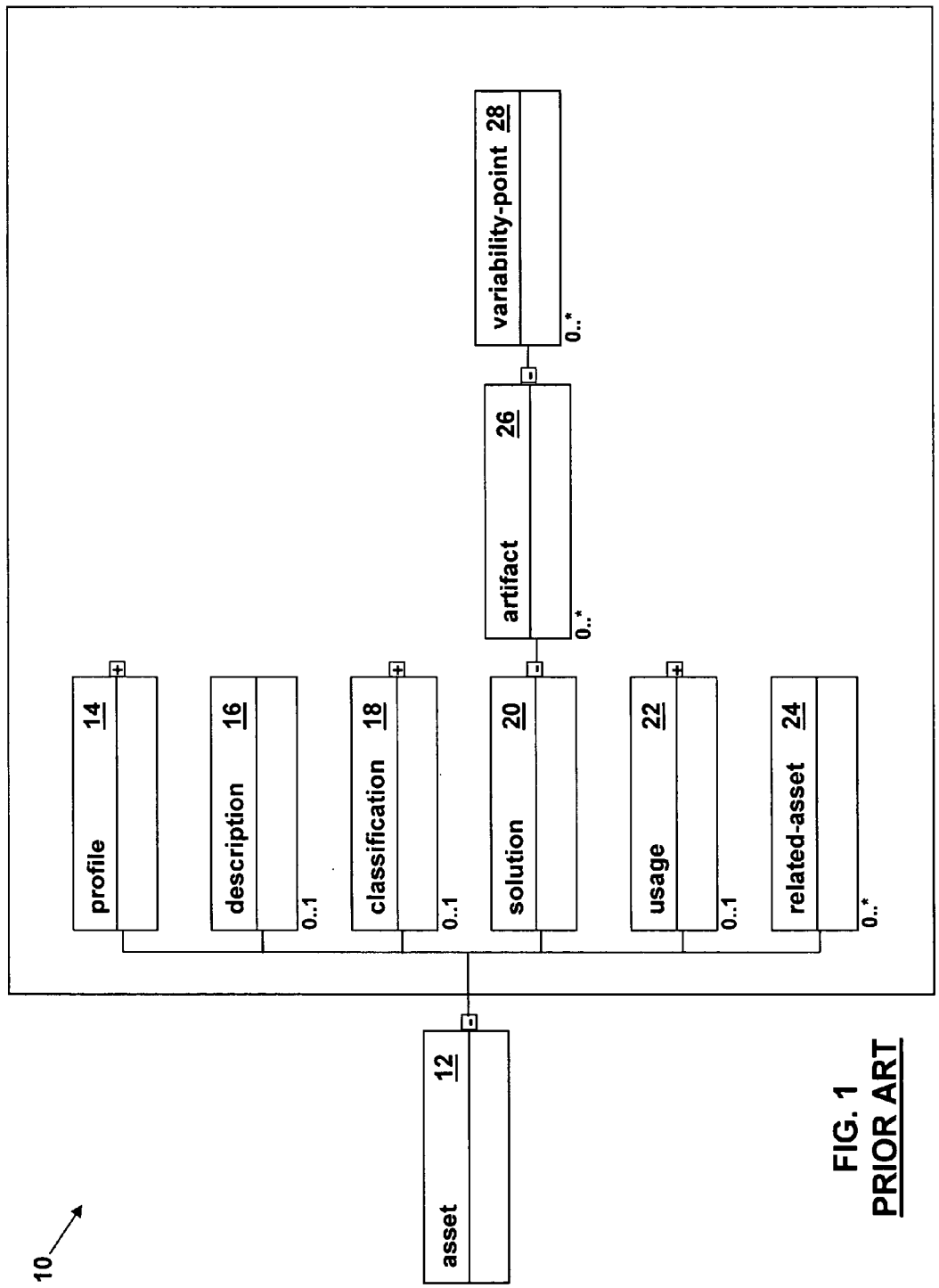
FIG. 1 depicts an illustrative XML schema for a RAS asset in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The Reusable Asset Specification (RAS) defines a standard way to package reusable software assets. A reusable software asset is, broadly speaking, any cohesive collection of artifacts that solve a specific problem or set of problems encountered in the software development life cycle. A reusable software asset is created with the intent of reuse. A reusable asset is distinguished from other artifacts or collections of artifacts used in the software development life cycle by its packaging. A reusable asset's packaging is simply the set of files that implement the solution and a structured set of meta information that defines and describes the reusable asset as a whole.

It is assumed that the reader has an understanding of the Reusable Asset Specification (RAS). Accordingly, a detailed description of the Reusable Asset Specification is not included herein.

As described above, the present invention provides a virtual Reusable Asset Specification (RAS) repository for organizing and managing disparate software assets throughout a large enterprise. In accordance with the present invention, RAS repositories are built for runtime use as part of an enterprise system. Existing artifacts are wrapped in RAS using an adapter/wrapper RAS asset (i.e., creating RAS assets for the existing artifacts), such that many pieces of a software system can be accessed in a common, standardized way—without having to be re-written for use in a virtual RAS repository. By using the "related-asset" feature of RAS, artifacts can be considered in different ways according to their life cycle (e.g., a separate asset can be associated with each lifecycle phase of a software asset and these separate assets are all related together). Assets can be located across distant physical locations and brought together in one "virtual" RAS repository by taking advantage of the "related-asset" feature of RAS. Relationships amongst data can be maintained and linked data can be observed.

RAS repositories have been built as part of developer tools to store software RAS assets such as diagrams and source code. The present invention extends the concept of a RAS repository from a repository of archived software RAS assets to a system solution for enterprise management of archived, deployed, and instantiated RAS assets and the relationships among them, thereby creating a real, working, runtime solution based on RAS.

An illustrative extensible Markup Language (XML) schema 10 for a RAS asset 12 is depicted in FIG. 1. The RAS asset 12 includes a plurality of classes including profile 14, description 16, classification 18, solution 20, usage 22, and related-asset 24. The profile 14 identifies the particular type of RAS asset 12 being described. The description 16 provides a textual description/summary of the RAS asset 12. The classification 18 contains descriptors which classify the key characteristics and behaviors of the RAS asset 12. The solution 20 contains references to the artifact(s) 26 included in the RAS asset 12. The usage 22 provides information regarding how to apply/use the asset RAS 12. The related-asset 24 describes the relationships (if any) between the asset RAS 12 and other RAS assets.

Each artifact 26 can include a plurality of classes, including variability-point 28, description, artifact-context, artifact-dependency, artifact-type, and artifact. The variability-point 28 defines a point of customization that can be altered by a customer of the RAS asset 12. Each variability-point 28 describes where and what in the artifact 26 can be modified.

Figure 2:
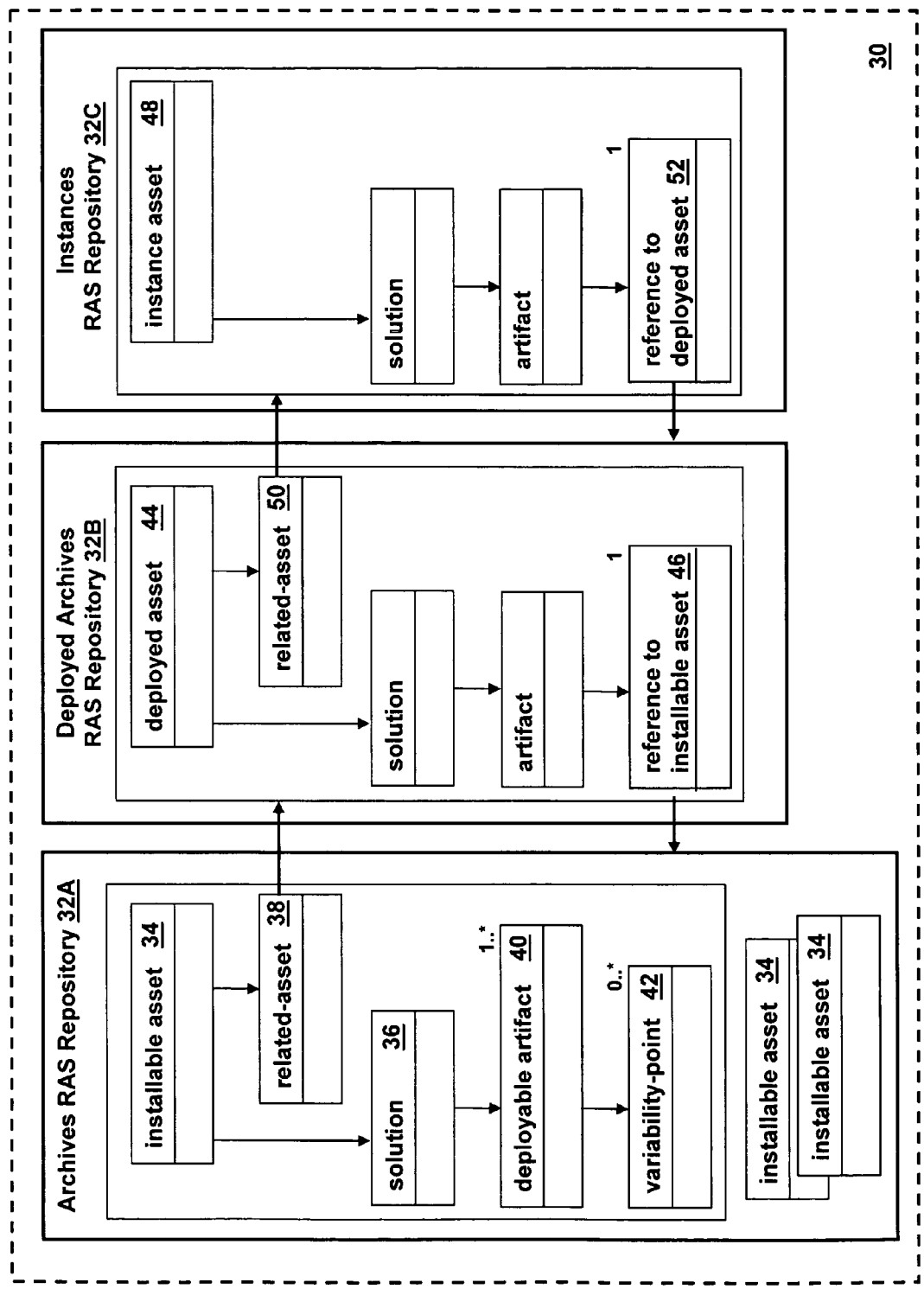
FIG. 2 depicts an illustrative virtual RAS repository provided in accordance with an embodiment of the present invention.

An illustrative virtual RAS repository 30 provided in accordance with an embodiment of the present invention is depicted in FIG. 2. The virtual RAS repository 30 includes a plurality of RAS repositories 32 (e.g., 32A, 32B, and 32C). As shown, the RAS repository 32A, referred to as an "archives" repository, holds at least one "installable" RAS asset 34. Each installable RAS asset 34 includes a solution 36 and a related-asset 38. The solution 36 includes at least one "deployable" artifact 40, which can include zero or more variability-points 42.

Once an installable RAS asset 34 held in the archives RAS repository 32A has been deployed (e.g., to a J2EE server), the deployed artifact 40 is wrapped in RAS to create a "deployed" RAS asset 44, which is stored in a "deployed archives" RAS repository 32B. Thus, the deployed archives RAS repository 32B contains a deployed RAS asset 44 for each deployment of an installable RAS asset 34 stored in the archives RAS repository 32A. An installable RAS asset 34 may have multiple related deployed RAS assets 44.

An installable RAS asset 34 in the archives RAS repository 32A is linked to a corresponding deployed RAS asset 44 in the deployed archives RAS repository 32B using a related-asset 38. The link provided by a related-asset 38 may comprise, for example, an URL which includes information regarding which server the installable RAS asset 34 was deployed to and the path within that server. Other methodologies for linking an installable RAS asset 34 in the archives RAS repository 32A to a corresponding deployed RAS asset 44 in the deployed archives RAS repository 32B are also possible. A deployed RAS asset 44 may further provide a reference 46 back to a corresponding installable RAS asset 34 in the archives RAS repository 32A.

One or more instances can be created from a deployed RAS asset 44 stored in the deployed archives RAS repository 32B. Each instance of a deployed RAS asset 44 is wrapped in RAS to create an "instance" RAS asset 48, which is stored in a "instances" RAS repository 32C. A deployed RAS asset 44 in the deployed archives RAS repository 32B is linked to a corresponding instance RAS asset 48 in the instances RAS repository 32C using a related-asset 50. Each instance RAS asset 48 further provides a reference 52 back to a corresponding deployed RAS asset 44 in the deployed archives RAS repository 32B. A deployed RAS asset 44 may have multiple related instance RAS assets 48. The link provided by a related-asset 50 may comprise, for example, an URL which includes information regarding an instantiation of a deployed RAS asset 44. Other linking methodologies are also possible.

Although the virtual RAS repository 30 depicted in FIG. 2 has been described as including an archives RAS repository 32A, a deployed archives RAS repository 32B, and an instances RAS repository 32C, it will be apparent to one skilled in the art that that many different combinations/types of RAS repositories 32 could be included in a virtual RAS repository 30 in accordance with the teachings of the present invention.

Figure 3:
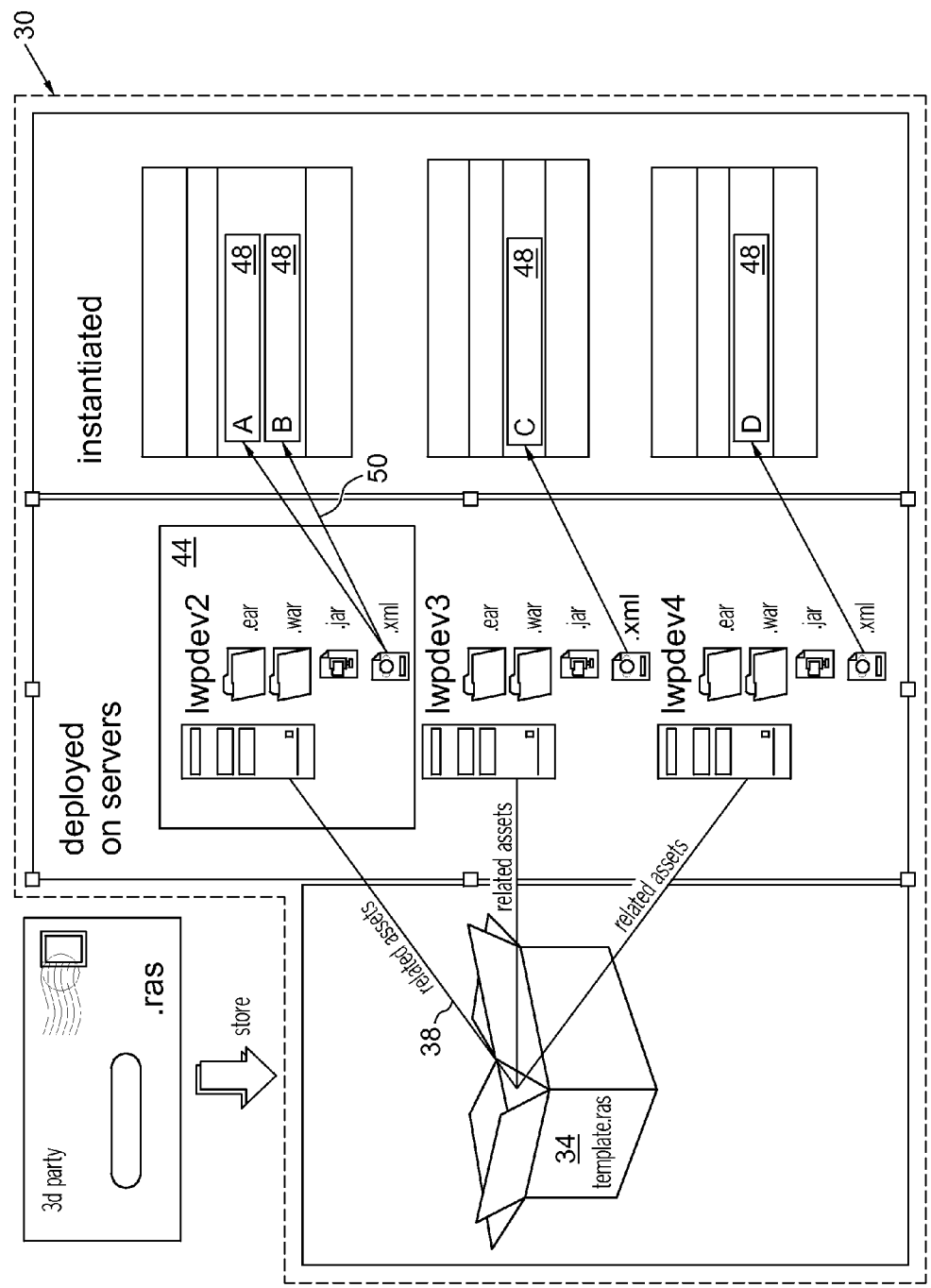
FIG. 3 depicts another illustrative virtual RAS repository provided in accordance with an embodiment of the present invention.

As detailed above, the present invention uses linked RAS repositories (e.g., archives RAS repository 32A, deployed archives RAS repository 32B, and instances RAS repository 32C), which are logically treated as a virtual RAS repository 30 at runtime through the use of the related-assets 38, 50. As an example, a portlet WAR installable RAS asset 34 (stored in the archives RAS repository 32A) could be linked via a related-asset 38 to a deployed RAS asset 44 representing the portlet deployed (stored in the deployed archives RAS repository 32B), and also linked via a related-asset 50 to an instance RAS asset 48 representing the portlet instantiated (stored in the instances RAS repository 32C). A practical example of such a virtual RAS repository 30 is illustrated in FIG. 3.

In accordance with the present invention, linked data can be set up so that information acquired during one operation can be applied to a subsequent related operation (e.g., user-entered information at deployment such as server names can be used later at instantiation). For example, a variability point for an application can be defined at one stage and fed as a constant to the next stage. Since a relationship is be maintained between an original deployed asset and the instances created from it, the ability to propagate changes to the instantiations of that asset is possible. Further, data relationships across repositories are maintained, allowing statistics gathering, problem tracking, evaluation, etc.

Figure 4:
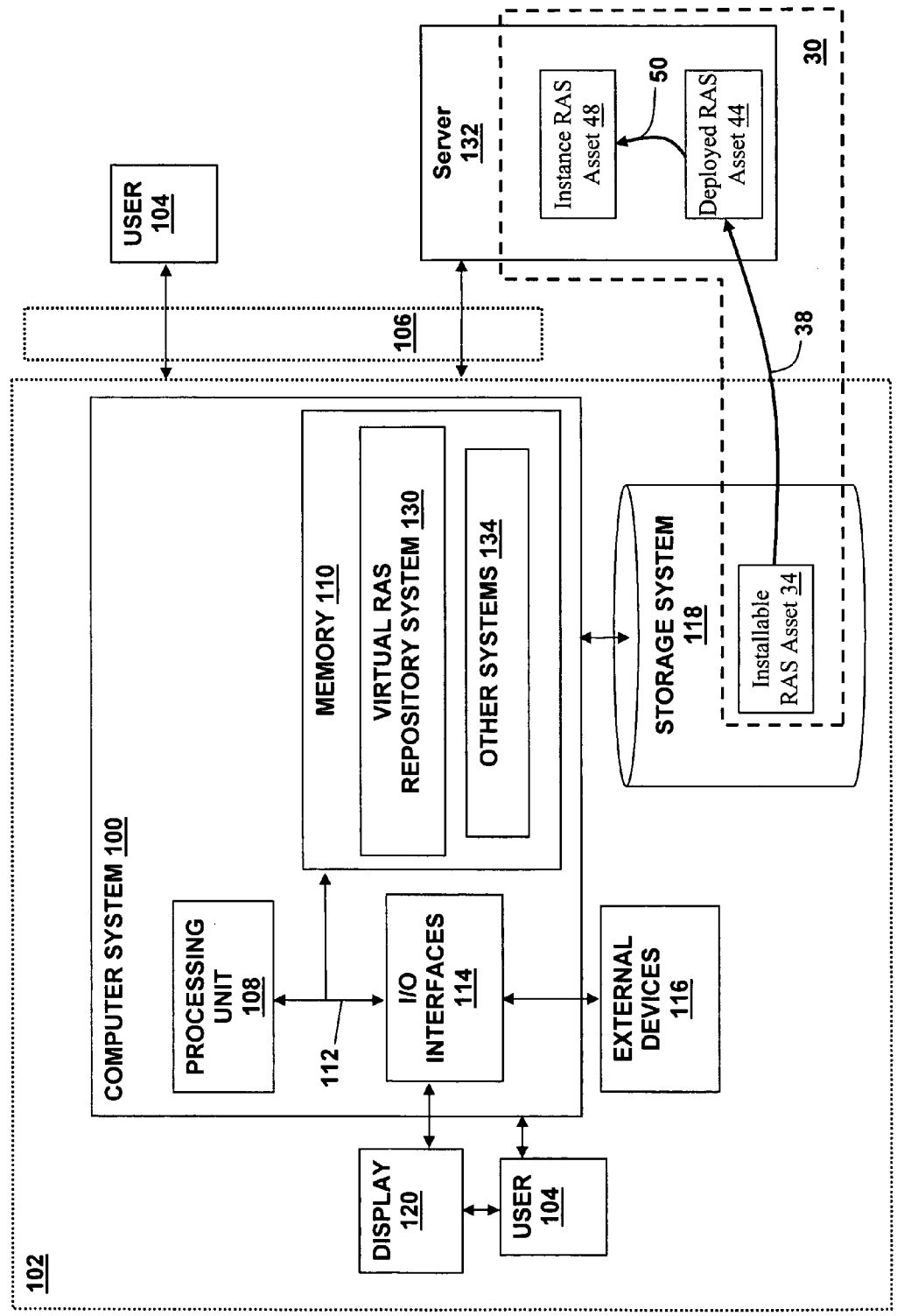
FIG. 4 depicts an illustrative computer system for implementing embodiment(s) of the present invention.

A computer system 100 for providing a virtual RAS repository 30 in accordance with an embodiment of the present invention is depicted in FIG. 4. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a virtual RAS repository in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc.). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as a virtual RAS repository system 130, stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 4 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a virtual RAS repository system 130 for providing a virtual RAS repository 30 in accordance with the present invention, as described above. When an installable RAS asset 34 stored in the storage system 118 is deployed (e.g., to a remote server 132) and subsequently instantiated, the virtual RAS repository 30 system is configured to "bring together" the installable RAS asset 34, the corresponding deployed RAS asset(s) 44, and the corresponding instance RAS asset(s) 48 into one virtual RAS repository 30 using related-assets 38 and 50, as described above. Memory 110 may also include other systems 134 for providing various functions of the present invention (e.g., RAS wrapping of artifacts, asset deployment, asset instantiation, etc.).

The present invention can be offered as a business method on a subscription or fee basis. For example, one or more components of the present invention can be created, maintained, supported, and/or deployed by a service provider that offers the functions described herein for customers. That is, a service provider can be used to provide a service for providing a virtual RAS repository, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing a virtual Reusable Asset Specification (RAS) repository, comprising:
   providing, using a computing device, separate RAS assets for different lifecycle phases of a software asset in a plurality of different RAS repositories, the plurality of different RAS repositories together forming the virtual RAS repository at runtime through use of RAS related-assets, the plurality of different RAS repositories comprising:
      an archives RAS repository for storing an installable RAS asset, the installable RAS asset including at least one artifact for implementing a solution, meta information for defining and describing the at least one artifact, and an archive RAS related-asset;
      a deployed archives RAS repository for storing a deployed RAS asset corresponding to a deployment of the installable RAS asset stored in the archives RAS repository, the deployed RAS asset including a deployed RAS related-asset and a reference back to the installable RAS asset stored in the archives RAS repository, wherein the installable RAS asset stored in the archives RAS repository can have multiple related deployed RAS assets; and
      an instances RAS repository for storing an instance RAS asset corresponding to an instantiation of the deployed RAS asset stored in the deployed archives RAS repository, the instance RAS asset including a reference back to the deployed RAS asset stored in the deployed RAS repository, wherein the deployed RAS asset stored in the deployed archives RAS repository can have multiple related instance RAS assets;
   linking, using the computing device, the installable RAS asset stored in the archives RAS repository with the deployed RAS asset stored in the deployed archives RAS repository using the archive RAS related-asset, wherein the archive RAS related-asset comprises a uniform resource locator (URL), and wherein the URL of the archive RAS related asset includes information regarding a server on which the installable RAS asset was deployed and a path within the server; and
   linking, using the computing device, the deployed RAS asset stored in the deployed archives RAS repository with the instance RAS asset stored in the instances RAS repository using the deployed RAS related-asset, wherein the deployed RAS related-asset comprises an URL, and wherein the URL of the deployed RAS related-asset includes information regarding an instantiation of the deployed RAS asset.

2. The method of claim 1, wherein the deployed archives RAS repository stores a plurality of deployed RAS assets corresponding to a plurality of deployments of the installable RAS asset stored in the archives RAS repository, each of the plurality of deployed RAS assets including a respective deployed RAS related-asset and a respective reference back to the installable RAS asset stored in the archives RAS repository.

3. The method of claim 1, wherein the different RAS repositories are located in different physical locations.

4. The method of claim 1, wherein the instances RAS repository stores a plurality of instance RAS assets corresponding to a plurality of instantiations of the deployed RAS asset stored in the deployed archives RAS repository, each of the plurality of instance RAS assets including a respective reference back to the deployed RAS asset stored in the deployed archive RAS repository.

5. The method of claim 1, further comprising:
   wrapping existing artifacts in RAS to create RAS assets for the existing artifacts.

6. A system for providing a virtual Reusable Asset Specification (RAS) repository, comprising:
   a computer device, including:
   a system for providing separate RAS assets for different lifecycle phases of a software asset in a plurality of different RAS repositories, the plurality of different RAS repositories together forming the virtual RAS repository at runtime through use of RAS related-assets, the plurality of different RAS repositories comprising:
      an archives RAS repository for storing an installable RAS asset, the installable RAS asset including at least one artifact for implementing a solution, meta information for defining and describing the at least one artifact, and an archive RAS related-asset;
      a deployed archives RAS repository for storing a deployed RAS asset corresponding to a deployment of the installable RAS asset stored in the archives RAS repository, the deployed RAS asset including a deployed RAS related-asset and a reference back to the installable RAS asset stored in the archives RAS repository, wherein the installable RAS asset stored in the archives RAS repository can have multiple related deployed RAS assets; and
      an instances RAS repository for storing an instance RAS asset corresponding to an instantiation of the deployed RAS asset stored in the deployed archives RAS repository, the instance RAS asset including a reference back to the deployed RAS asset stored in the deployed RAS repository, wherein the deployed RAS asset stored in the deployed archives RAS repository can have multiple related instance RAS assets; and
   a system for linking the installable RAS asset stored in the archives RAS repository with the deployed RAS asset stored in the deployed archives RAS repository using the archive RAS related-asset, wherein the archive RAS related-asset comprises a uniform resource locator (URL), and wherein the URL of the archive RAS related asset includes information regarding a server on which the installable RAS asset was deployed and a path within the server and for linking the deployed RAS asset stored in the deployed archives RAS repository with the instance RAS asset stored in the instances RAS repository using the deployed RAS related-asset, wherein the deployed RAS related-asset comprises an URL, and wherein the URL of the deployed RAS related-asset includes information regarding an instantiation of the deployed RAS asset.

7. The system of claim 6, wherein the deployed archives RAS repository stores a plurality of deployed RAS assets corresponding to a plurality of deployments of the installable RAS asset stored in the archives RAS repository, each of the plurality of deployed RAS assets including a respective deployed RAS related-asset and a respective reference back to the installable RAS asset stored in the archives RAS repository.

8. The system of claim 6, wherein the different RAS repositories are located in different physical locations.

9. The system of claim 6, wherein the instances RAS repository stores a plurality of instance RAS assets corresponding to a plurality of instantiations of the deployed RAS asset stored in the deployed archives RAS repository, each of the plurality of instance RAS assets including a respective reference back to the deployed RAS asset stored in the deployed archive RAS repository.

10. The system of claim 6, further comprising:
    a system for wrapping existing artifacts in RAS to create RAS assets for the existing artifacts.

11. A program product stored on a non-transitory computer readable medium for providing a virtual Reusable Asset Specification (RAS) repository when executed by a computer system, the computer readable medium comprising program code for:
    providing separate RAS assets for different lifecycle phases of a software asset in a plurality of different RAS repositories, the plurality of different RAS repositories together forming the virtual RAS repository at runtime through use of RAS related-assets, the plurality of different RAS repositories comprising:
        an archives RAS repository for storing an installable RAS asset, the installable RAS asset including at least one artifact for implementing a solution, meta information for defining and describing the at least one artifact, and an archive RAS related-asset;
        a deployed archives RAS repository for storing a deployed RAS asset corresponding to a deployment of the installable RAS asset stored in the archives RAS repository, the deployed RAS asset including a deployed RAS related-asset and a reference back to the installable RAS asset stored in the archives RAS repository, wherein the installable RAS asset stored in the archives RAS repository can have multiple related deployed RAS assets; and
        an instances RAS repository for storing an instance RAS asset corresponding to an instantiation of the deployed RAS asset stored in the deployed archives RAS repository, the instance RAS asset including a reference back to the deployed RAS asset stored in the deployed RAS repository, wherein the deployed RAS asset stored in the deployed archives RAS repository can have multiple related instance RAS assets;
    linking the installable RAS asset stored in the archives RAS repository with the deployed RAS asset stored in the deployed archives RAS repository using the archive RAS related-asset, wherein the archive RAS related-asset comprises a uniform resource locator (URL), and wherein the URL of the archive RAS related asset includes information regarding a server on which the installable RAS asset was deployed and a path within the server; and
    linking the deployed RAS asset stored in the deployed archives RAS repository with the instance RAS asset stored in the instances RAS repository using the deployed RAS related-asset, wherein the deployed RAS related-asset comprises an URL, and wherein the URL of the deployed RAS related-asset includes information regarding an instantiation of the deployed RAS asset.

12. The program product of claim 11, wherein the deployed archives RAS repository stores a plurality of deployed RAS assets corresponding to a plurality of deployments of the installable RAS asset stored in the archives RAS repository, each of the plurality of deployed RAS assets including a respective deployed RAS related-asset and a respective reference back to the installable RAS asset stored in the archives RAS repository.

13. The program product of claim 11, wherein the different RAS repositories are located in different physical locations.

14. The program product of claim 11, wherein the instances RAS repository stores a plurality of instance RAS assets corresponding to a plurality of instantiations of the deployed RAS asset stored in the deployed archives RAS repository, each of the plurality of instance RAS assets including a respective reference back to the deployed RAS asset stored in the deployed archive RAS repository.

15. The program product of claim 11, further comprising program code for:
    providing RAS assets by wrapping existing artifacts in RAS to create RAS assets for the existing artifacts.

* * * * *